United States Patent [19]
Antoniol et al.

[11] Patent Number: 5,765,133
[45] Date of Patent: Jun. 9, 1998

[54] SYSTEM FOR BUILDING A LANGUAGE MODEL NETWORK FOR SPEECH RECOGNITION

[75] Inventors: Giuliano Antoniol, Pergine; Fabio Brugnara, Trento; Mauro Cettolo, Manzano; Marcello Federico, Trento, all of Italy

[73] Assignee: Istituto Trentino Di Cultura, Trento, Italy

[21] Appl. No.: 616,343

[22] Filed: Mar. 15, 1996

[30] Foreign Application Priority Data

Mar. 17, 1995 [IT] Italy ................................. TO95A0200

[51] Int. Cl.$^6$ ................................................ G10L 5/00
[52] U.S. Cl. ...................... 704/355; 704/231; 704/236; 704/240; 704/251; 704/256; 704/258; 704/266
[58] Field of Search ........................ 395/2.4, 2.45, 395/2.49, 2.51, 2.6, 2.64, 2.65, 2.67, 2.75

[56] References Cited

U.S. PATENT DOCUMENTS

| | | | |
|---|---|---|---|
| 4,829,576 | 5/1989 | Porter | 395/2.44 |
| 4,831,550 | 5/1989 | Katz | 395/2.49 |
| 5,033,087 | 7/1991 | Bahl et al. | 395/2.65 |
| 5,467,425 | 11/1995 | Lau et al. | 395/2.52 |
| 5,579,436 | 11/1996 | Chou et al. | 395/2.53 |
| 5,621,859 | 4/1997 | Schwartz et al. | 395/2.65 |

OTHER PUBLICATIONS

L.R. Rabiner, "A tutorial on hidden Markov models and selection applications in speech recognition" Readings in Speech Recognition, pp. 287–296, Morgan Kaufmann, 1990.

F. Jelinek, "Self–organized language modeling for speech recognition" Readings in Speech Recognition, pp. 450–505, Morgan Kaufmann, 1990.

H. Ney, et al., "Data Driven Search Organization for Continuous Speech Recognition" IEEE Transactions on Signal Proceesing, vol. 40, No. 2, pp. 272–281, Feb., 1992.

L.E. Baum et al., "An inequality with applications to statistical prediction for functions of Markov processes and to a model for ecology", Bull. Amer. Math. Soc., 73:360-363, 1967.

L. Breiman, "Stacked regressions" Technical Report 367, Dept. of Statistics, U. of CA., Aug. 1992.

J. Hopcroft et al., "Introduction to Automata Theory, Languages and Computation", Addison–Wesley, 1979.

A. Aho, et al., "The Design and Analysis of Computer Algorithms", Addison–Wesley, 1974.

*Primary Examiner*—Allen R. MacDonald
*Assistant Examiner*—Alphonso A. Collins
*Attorney, Agent, or Firm*—Sughrue, Mion, Zinn, Macpeak & Seas, PLLC

[57] ABSTRACT

A system for recognizing continuous speech, for example for automatic dictation applications, uses a bigramme language model organized as a network with finite probability states. The system also uses methods of estimating the probabilities associated with the bigrammes and of representing the model of the language in a tree-like probability network.

17 Claims, 1 Drawing Sheet

SYSTEM FOR BUILDING A LANGUAGE MODEL NETWORK FOR SPEECH RECOGNITION

BACKGROUND OF THE INVENTION

The present invention relates in general to voice recognition systems, particularly systems for recognizing continuous speech and, more specifically, relates to the estimation of the language model and to its representation in a voice-recognition system.

Voice recognition systems are now quite widespread in the art and are used in a variety of applications in which a human being can communicate by voice with an electronic processor. These systems in fact enable an acoustic signal, the human voice, to be converted into data coded in digital format and representing the words spoken by a human speaker. It is thus possible to produce a man-machine interface which is particularly simple, convenient and efficient for man to use in place of devices such as alphanumeric keyboards and the like.

In place of such devices, a system of this type uses an acoustic sensor, for example, a microphone, which is connected to an analog-digital converter circuit in order to transform the acoustic signal emitted by the speaker into a format compatible with an electronic processor. Finally, a system of this type uses a processing unit to decode the converted acoustic signal into a signal indicative of the words spoken.

The processing unit may be dedicated to this task or may be formed with the use of some of the processing capacity of the electronic processor which is intended to receive the decoded signal, in a manner well-known in the art. This processing unit generally requires considerable power given the complexity of the task which it is called upon to perform and therefore there is a need to improve the efficiency and the performance of systems of this type. A characteristic application envisages the use of these systems as interfaces in automatic dictation equipment and systems.

Most current prototypes of systems for recognizing continuous speech carry out a decoding process by means of a search algorithm which operates on a representation of the search area.

Given a representation of an input signal Y, the task of the decoding process is to calculate the word string (sequence) W which maximizes the following Bayesian decision criterion:

$$W = \arg\max_{W} Pr(W)Pr(Y|W)$$

where Pr(W) is the a priori or linguistic probability of a string W and Pr(Y|W) is its acoustic probability, that is, the probability that Y corresponds to that string.

The acoustic probability of a string is calculated with the use of certain stochastic models, known as hidden Markov models (HMMs) ; in this connection see "A tutorial on hidden Markov models and selected applications in speech recognition" by L. R. Rabiner in "Readings in speech recognition" by A. Weibel and K. Lee, pages 267–296, Morgan Kaufmann, 1990, which represent the phonetic units of the recognized language. Each word in the dictionary is modelled by means of one or more sequences of these units.

The linguistic probability Pr(W) is calculated from the language model by means of a stochastic model known as a bigramme model. In this connection see "Self-organized language modelling for speech recognition" in "Readings in speech recognition" by A. Weibel and K. Lee, pages 450–505, Morgan Kaufmann, 1990.

The search for the so-called optimal string is carried out by a beam search algorithm; in this connection see H. Ney, D. Mergel, A. Noll and A. Paesler "Data driven search organization for continuous speech recognition" IEEE transactions on signal processing Vol. 40, No. 2, pp. 272–281, February 1992 on a network of finite states which represents, in probability terms, the set of word strings accepted by the recognizer. During the search, the evaluation of partial hypotheses takes place with the use of both linguistic and acoustic probabilities obtained by comparing the representation of the signal with the models of the words.

SUMMARY OF THE INVENTION

The object of the present invention is to provide a system for recognizing continuous speech which is more reliable and efficient, that is, with improved performance in comparison with systems of this type according to the prior art.

The efficiency and accuracy of the recognition system are strictly related to the language model (LM) performance (usually measured in terms of perplexity) and to its representation in terms of a search network.

The object of the present invention is to provide a method for constructing a LM network which is well suited for the beam-search decoding algorithm.

According to the present invention, this object is achieved by virtue of a system for recognizing continuous speech having the characteristics indicated in the claims which follow the present description.

BRIEF DESCRIPTION OF THE DRAWINGS

Further advantages and characteristics of the present invention will become clear from the following detailed description given with the aid of the appended drawings, provided by way of non-limiting example, in which.

DETAILED DESCRIPTION OF THE INVENTION

Figure 1:
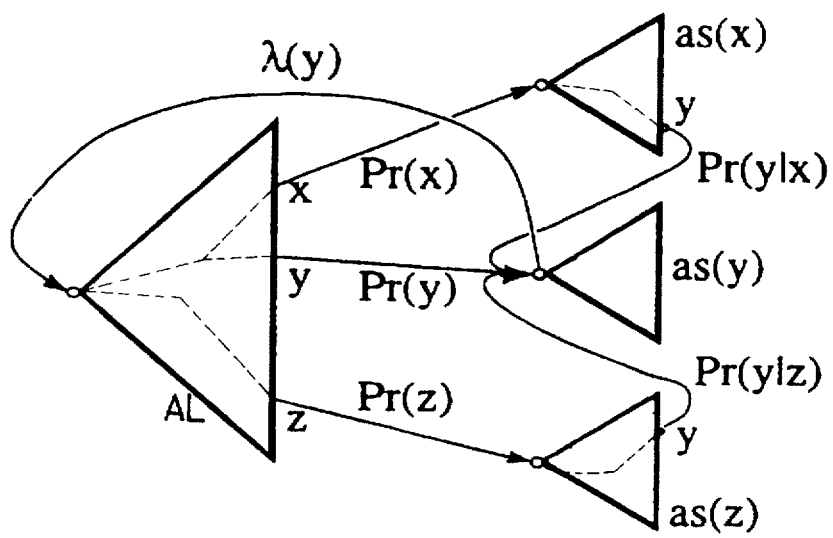
FIG. 1 is a schematic representation of a data structure of the system according to the present invention.

The system according to the invention uses an original method of estimating the probabilities of the language model from a sample of texts and an original representation of the search area for the decoding algorithm which will be described below.

Naturally, the system according to the present invention is configured in a manner such as to perform the so-called low-level steps and stages of the processing of the acoustic signal to be recognized, which will not be described in detail herein since they do not differ from similar operations carried out by systems of this type and are therefore widely known in the art. The present description is intended principally, however, to describe the original components of the system according to the invention.

In particular, the differences in comparison with the prior art relate to the language model and to its estimation and representation in the system according to the invention, for which reason, the present description will concern essentially these aspects. The components and steps of the system not explicitly described herein may be assumed to be of a type known in the art.

Similarly, the techniques and methods for the production of the system according to the invention, for which conventional processing architecture within the capabilities of an expert in the art may be used, should also be considered known.

To summarize, the invention is intended to be embodied into a speech recognition system that processes speech according to the following steps:

acquistion of the acoustic signal comprising words spoken by a speaker in form of numeric samples, transformation of the sample speech into a sequence of acoustic feature vectors, conveying spectral information, decoding of the feature sequence into a word sequence by employing a beam search based algorithm on a network of finite states which embodies linguistic and lexical constraints.

Estimation of the language model

The statistical language model constitutes the linguistic knowledge of the field considered. Its function is to suggest to the decoding algorithm the most probable words which may follow a certain context, generally constituted by one or more words, to the decoding algorithm. If the context is formed by a single word, the language model used is the model of bigrammes, that is, pairs of consecutive words. A bigramme model estimates the probability of a text or sequence of words $W=w_1, \ldots, w_N$ by means of the following approximation:

This approximation which formally adopts a homogeneous Markov process, requires the estimation of the probability Pr(z|y) of a generic bigramme yz.

The estimation of probabilities is usually based on the bigramme counts relating to a learning text which reflects, as far as possible, the language of the field considered. A phenomenon typical of texts, however, is the so-called spread of data which in practice means that there are many rare bigrammes and few very frequent bigrammes. Moreover, there are many possible bigrammes which never appear in the learning text but to which the language model nevertheless has to assign a probability other than zero.

In the approach most often used to estimate a bigramme language model, use is made of:

a discount function which subtracts from the relative frequencies of the bigrammes f(z|y) probability portions which, put together, constitute the total probability $\lambda(y)$ to be assigned to the bigrammes never seen in the context y;

a redistribution function which divides the total probability $\lambda(y)$ amongst the bigrammes never seen in the context y;

a calculation scheme which combines the two previous functions to calculate the probability of a generic bigramme.

Although many methods exist for calculating the discount function, the probability of bigrammes with zero frequency is usually redistributed in proportion to the a priori probabilities of the single words or unigrammes, Pr(z). This latter probability can be calculated by conventional methods such as, for example, the relative frequency f(z). A calculation scheme known in the literature and used herein is the interpolated scheme:

in which c(•) indicates the number of occurrences (appearances) in a text.

According to the interpolated scheme, the probability of the bigramme is expressed as an interpolation of the discounted relative frequency f(•) and of the redistribution function.

The discount function used here is the linear one for which:

$$f(z|y)=(1-\lambda(y))f(z|y)$$

A linear interpolated model involves the estimation of the parameters $\lambda(y)$ for each word y of the vocabulary V.

The estimation of the linear interpolated model is based on the combination of an estimation technique known as cross-validation and a method of interpolation between estimators, known as stacked estimation.

Without losing generality, the linear interpolated model can be rewritten as:

$$Pr(z|y)=(1-\lambda(y))f(z|y)+\lambda(y)Pr(z) \qquad (2)$$

where $0<\lambda(y)\leq 1$ $\forall y$ and $\lambda(y)=1$ if $c(y)=0$.

Each parameter $\lambda(y)$ can be estimated so as to maximize the following function known as the "leaving-one-out likelihood" on a learning text W:

where f*(z|y) is the relative frequency calculated on W after one occurrence of yz has been subtracted. This estimation criterion which is derived by combining the criterion of maximum likelihood with a cross-validation technique called "leaving-one-out" enables the bigrammes which are never seen to be simulated in the estimation function.

By applying a Baum and Egon theorem, in this connection see "An inequality with applications to statistical predictions for functions of Markov processes and to a model for ecology" by L. E. Baum and J. A. Egon in Bull. Amer. Math. Soc., 73:360–363, 1967, an iterative formula can be derived for calculating the values of the parameters which maximize LL locally in comparison with the initial values. The iterative formula is as follows:

where $S_y$ indicates the set of occurrences of the bigrammes which start with y in the learning text. The iterations on each parameter are checked according to another cross-validation criterion.

In fact, before starting to learn the parameters, the occurrences of bigrammes in the learning text are divided randomly into two portions, indicated $W_1$ and $W_2$, herein, in the ratio 3:4. The maximization of LL takes place on $W_1$ and the iterations of the generic parameter $\lambda(y)$ are interrupted if they lead to a decrease in likelihood of the bigrammes which start with y in the sample $W_2$. Upon completion of the learning, the relative frequencies are re-counted throughout the learning text W.

This technique obviously implies an additional cost in terms of material used for training in the parameters. A substantial part of the learning text is in fact used only for checking the maximization algorithm.

Stacked estimation method

In order to solve this problem, an original estimation method based on the interpolation of several estimators is introduced.

The interpolation of estimators is a technique used in regression theory, see in this connection "Stacked regressions" by L. Breiman, Technical Report 367, Dept. of Statistics, University of California, Berkeley, Calif., August 1992. This technique was the inspiration for the method proposed. The approach replicates at a different level what takes place for the interpolated model itself. That is, various interpolated linear models $Pr^1, \ldots, Pr^m$ are estimated and are then combined as follows:

Each language model is estimated on a different random division of the learning text into two sets $W_1$ and $W_2$ in the same proportions. Upon completion, the m language models thus estimated are combined and their average calculated. The resulting model is the following:

where $\lambda_i$ is the vector of parameters calculated with the i-th division of the learning text.

The resulting model has the same mathematical form as the simple interpolated model which can be extended to n-grammes with n>2 and to combination methods other than the simple arithmetic mean.

The steps used to estimate the bigramme language model considered herein will now be described in greater detail. The starting point is again a learning text which, for convenience, may be considered as a random sample of independent and identically distributed bigrammes. The estimate uses as an intermediate step an estimation algorithm based on a cross-validation which requires two learning samples: one for estimating the parameters by means of the iterative formula (4) and one for evaluating the condition for termination of the iterations.

The estimate proper is obtained by using this algorithm on m random divisions of the learning text and then calculating the average of the parameters estimated in each division. The first estimation algorithm will now be described.

Estimation algorithm with cross-validation ($W_1$, $W_2$)
1. Let $W_1$ and $W_2$ be two random samples of bigrammes and $W_2/y$ be the subset of bigrammes in $W_2$ which start with y.
2. Calculate the relative frequencies f(z|y) on $W_1$.
3. Initialize all of the parameters $\lambda(y)=0.5$.
4. For each parameter $\lambda(y)$ iterate the formula (4) as long as the likelihood of $W_2/y$ calculated with formula (3) increases.

The cross-validation estimation algorithm is used as an intermediate step in the stacked estimation algorithm. The learning text is divided randomly m times into two learning sub-samples to which the algorithm given above is applied. m different estimates of the interpolation parameters are thus obtained, of which the average value is calculated. Finally, the relative frequencies are calculated throughout the learning text. This last step completes the estimation of the linear interpolated bigramme language model.

Stacked estimation algorithm (W)
1. Let W be the random sample of bigrammes in the learning text,
2. For i=1, . . . , m,
3. Calculate a random division of W into two sets $W_1$ and $W_2$ in the proportion 2:3.
4. Calculate by means of the cross-validation estimation algorithm ($W_1, W_2$) the vector of parameters $\lambda^i = \{\lambda(y) : y \in V\}$
5. Calculate the average vector $\lambda = (1/m)\Sigma^m_{i=1}\lambda^i$
6. Calculate the relative frequencies f(z|y) on W.

Representation of the language model

The network of finite states on which the decoding algorithm carries out the search for the optimal solution is constructed by imposing a double set of constraints: an acoustic set limiting the sequence of phonemes permitted to correspond to the phonetic transcriptions of the words, and a linguistic set associating with the pairs of words the probabilities estimated by means of the formula indicated (2). For a treatise relating to networks of finite states see "Introduction to Automata Theory, Language and Computation" by J. Hopcroft and H. Ullman, Addison-Wesley, 1979.

The acoustic constraints: the lexicon tree

The first set of constraints is imposed so as to make use of the acoustic similarity of words. In effect, in a vocabulary of medium-large size there are many words which share the initial portion of their phonetic transcription. For this reason, the set of words is organized in a tree.

The tree has a root and as many leaves as there are words in the lexicon. The limbs entering the leaves are labelled both with the last phoneme and with the string of the word to which the leaf relates; all of the remaining limbs are labelled solely with phonemes. For each word of the dictionary, there is a path which, starting from the root passes through limbs labelled according to the phonetic transcription of the word and ends in the leaf which identifies it.

Words which share the initial portion of the phonetic transcription also share their path up to the point at which the transcription coincides. Homophonic words, that is, words with the same phonetic transcription, share the path up to the penultimate limb, the last limb remaining distinct to permit unambiguous correspondence between leaves and words.

The linguistic constraints: trees of successors

In order to insert the linguistic constraints defined by the language model in the network, for each word of the dictionary, the set of successors actually observed in the learning text is organized in a tree exactly as for the entire lexicon. Thus, if the word y is an observed successor to the word z, then the tree of successors of z will have a leaf relating to the word y.

The probabilities provided by the language model are then inserted in the network by associating them with the unlabelled limbs, which are therefore called empty limbs and which connect the tree of the entire lexicon and the tree of successors in the manner described below. FIG. 1 shows, for a better understanding and by way of example, a portion of a finite states tree network for representing the language model. In the drawing, the lexicon tree is indicated AL and the trees of successors of the words x, y and z are indicated as(x), as(y), as(z), respectively.

If y is an observed successor of x, then the probability Pr(y|x) is assigned to an empty limb which connects the leaf relating to y of the tree as(x) of successors of x with the root of the tree as(y) of successors of y. Each leaf of the complete lexicon tree AL is connected to the root of the tree of successors of the word which it identifies, if it is y, by means of an empty limb with which the unigramme probability Pr(y) is associated. An empty limb branches out from the root of the tree as(y) of successors of y towards the root of the tree of the entire lexicon AL with the associated probability quantity $\lambda(y)$.

Factorization of the probabilities

If the search for the optimal solution is made in the network of FIG. 1, the acoustic data associated with the hidden Markov models with which the phonemes are modelled and the linguistic data specified by the empty limbs are used in clearly distinct regions of the network.

Figure 2:
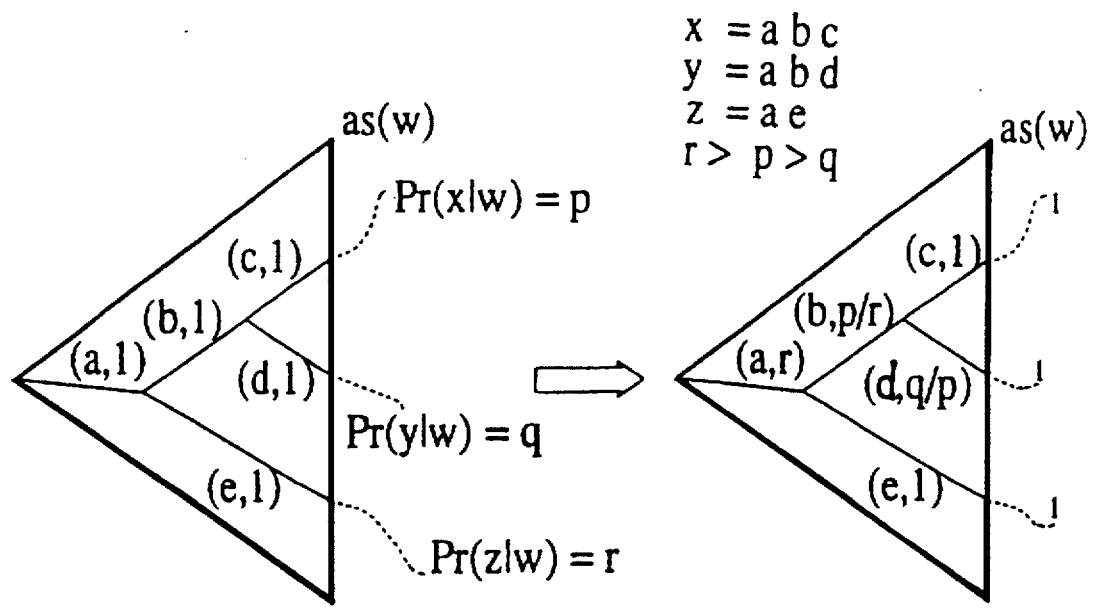
FIG. 2 shows schematically a step in the algorithm for constructing the data structure used by the system.

In order to use the linguistic data before the point at which it is available in the network of FIG. 1, a factorization of the probabilities is carried out. When several words share a phoneme, both inside the lexicon tree AL and in the trees of successors as(w), it is possible to use the greatest probability amongst those of the limbs emerging from the leaves which identify these words. FIG. 2 shows, for a better understanding, a possible step of an operation to factorize the probabilities of the network shown in FIG. 1, as will be specified further below.

The factorization of the probabilities of the network takes place by the application of the probabilities factorization algorithm which will be described below, to the tree AL of the entire lexicon and to the trees of successors as (w). This algorithm requires the probabilities of all of the limbs to be unitary except those of the limbs entering the leaves, which are constrained solely to be other than zero. In effect, the application of the probabilities factorization algorithm is preceded by the displacement of the probabilities of the language model inside the trees as shown in FIG. 2. The probabilities of the empty limbs emerging from the leaves are thus transferred to the limbs entering the same leaves, after which the factorization of the probabilities can take place.

Optimization of the network

The use of the maximum amongst all of the probabilities of the words which share a certain phoneme involves the application of the correct value of the language model as soon as the word no longer shares any phoneme with other words. Moreover, the factorization of the probabilities implies that the probability value 1 remains associated with all of the empty limbs emerging from the leaves of the trees. These limbs can therefore be eliminated, bringing about the collapse of the states connected thereby.

The network thus obtained is finally reduced with the use of one of the algorithms known in the literature for minimizing the number of states of an automaton to deterministic finite states, for example, in the text "The Design and Analysis of Computer Algorithms" by A. Aho, J. Hopcroft and J. Ullman, Addison-Wesley, 1974, already mentioned. Since the network is not deterministic, given the presence of empty limbs and is probabilistic, having its limbs associated with a probability, whether or not they are empty, the use of one of these algorithms necessitates the use of some measures.

First of all, a fictitious symbol is associated with the empty limbs so that they are considered to all effects and purposes as labelled limbs. In the second place, given that the operation of these algorithms is based on the labels associated with the limbs, each limb is labelled with a single string obtained by linking the symbol of the phoneme, the probability and, where it is present, the word.

Algorithm for factorizing the probabilities in a tree

T: tree to be factorized;
a,b,n,s: states of T;
r: root of T;
F(n): set of successor states of the state n;
p(a,b): probability of the limb from a to b From the language model to the network The steps described above for the construction of the network which represents the language model are given below in algorithmic form:

1. Construct the tree of the entire lexicon.
2. For each word of the lexicon, construct the tree of successors seen in the learning text.
3. Insert the probabilities provided by the language model by means of the empty transitions.
4. Transfer the probabilities into the trees.
5. Factorize the probabilities in the trees.
6. Eliminate the superfluous empty transitions.
7. Label the remaining empty transitions with a fictitious symbol $\epsilon$.
8. Label each limb with the string obtained by linking the phoneme or the symbol $\epsilon$, the probability and the word, if present.
9. Optimize the network.
10. Reassign to each limb the phoneme or the symbol $\epsilon$, the probability and possibly the word starting from the string obtained in step 8.

The original solutions according to the present invention for estimating the language model and for constructing the network with which the language model is represented have been used by the Applicant to produce a system for recognizing continuous speech, based on hidden Markov models.

The field of use was that of radiological reporting in the Italian language. The original topology of the network enabled a limited dynamic dimension of the recognition process to be achieved.

The system according to the present invention is applicable, however, in all fields in which an affinity may be found with the specific problems of speech recognition. For example, the same approach may be used for character recognition. The original techniques proposed in the present invention are therefore directly transferable to this field.

More generally, the solutions proposed are transferable to any field in which a classification of sequences of symbols is carried out such that:

the classification takes place by means of a beam search algorithm based on dynamic programming;

the sequences of symbols can be modelled by a bigramme language model.

Naturally, the principle of the invention remaining the same, the details of construction and forms of embodiment may be varied widely with respect to those described and illustrated, without thereby departing from the scope of the present invention.

What is claimed is:

1. A system for recognizing continuous speech configured so as to perform the following steps:

to acquire an acoustic signal comprising words spoken by a speaker, to process the acoustic signal so as to generate a signal indicative of acoustic parameters present in the acoustic signal, and to decode the signal indicative of acoustic parameters so as to generate an output signal indicative of the words pronounced by the speaker, the decoding step comprising a step of comparing the signal indicative of a language and with a lexicon relating to the words spoken by the speaker, the language model being represented by means of a tree-like probabilistic network of finite states of the lexicon, wherein said network is constructed, in a preliminary stage, with the use of a linear interpolated language model to assign the probabilities to the network, wherein said language model is based on bigrammes, and wherein said system uses the following function to assign the respective probability to each bigramme:

$$Pr(z/y) = \begin{cases} f(z/y) + \gamma(y)PR(z) & \text{if } c(y) > 0 \\ Pr(z) & \text{if } c(y) = 0 \end{cases} \quad (1)$$

PR(z/y) being the probability of a generic bigramme yz, $\gamma(y)$ being the total probability assigned to the bigrammes with zero frequency in the context y, Pr(z), the a priori probability of z, f'(z/y) being given by:

$$f(z/y) = (1-\gamma(y))f(z/y)$$

f(z/y) being the relative frequency of the bigramme yz and c(y) being the number of occurrences of y in a sample acoustic signal.

2. A system according to claim 1, wherein the linear interpolated model is calculated using the following function:

$$Pr(z/y) = (1-\lambda(y))f(z/y) + \lambda(y)Pr(z))$$

where $0 < \lambda(y) \leq 1$ $\forall y$ and $\lambda(y) = 1$ if $c(y) = 0$.

3. A system according to claim 2, wherein said linear interpolated model involves the estimation of the parameter λ(y) for each word y of the lexicon and uses a cross-validation estimation method and a stacked estimation method of interpolation between estimators to estimate the parameters λ(y).

4. A system according to claim 3, wherein each parameter λ(y) is estimated in a manner such as to maximize a function of the "leaving-one-out likelihood" type, known as LL, defined by the following formula:

on the learning text, indicated W, f*(z|y) being the relative frequency calculated on the sample signal W after one occurrence of yz has been subtracted, and V being the lexicon.

5. A system according to claim 4, wherein said system uses the following iterative formula to calculate the values of the parameters λ(y) which maximize LL locally in comparison with initial values:

in which $S_y$ indicates the set of occurrences of the bigrammes which start with y in the learning text W.

6. A system according to claim 5, wherein, before the estimation of the parameters λ(y) is started, the occurrences of bigrammes in the sample signal are divided randomly into two portions $W_1$ and $W_2$, substantially in the ratio 3:4, the maximization of LL taking place on $W_1$ and the iterations of a generic parameter λ(y) being interrupted if they lead to a decrease in the likelihood of the bigrammes which start with y in the portion $W_2$.

7. A system according to claim 6, wherein said system uses an estimation method based on the interpolation of several estimators, in which m different interpolated linear models $Pr^1, \ldots, Pr^m$, with m>1, are estimated and are then combined as follows:

each model of the language being estimated on a different random division of the learning text into the two sets $W_1$ and $W_2$ in the same proportions.

8. A system according to claim 7, wherein the language models estimated are combined by calculating their average in a manner such that the resulting model is the following:

in which $\lambda_1$ is a vector of parameters calculated with an i-th division of the learning text.

9. A system according to claim 8, wherein the estimation of the parameter λ(y) comprises the steps of:

calculating a random division of W into two sets $W_1$ and $W_2$ in a proportion of 2:3, calculating the vector of parameters $\lambda^i = \{(y):y \in V\}$ by means of a cross-validation estimation method ($W_1$ $W_2$) calculating the average vector $\lambda = (1/m)\Sigma^m_{i=1}\lambda^i$, and calculating the relative frequencies f(z|y) on W, where W is a random sample of bigrammes and i=1, ..., m, the cross-validation estimation method comprising the following steps, where $W_1$ and $W_2$ being two random samples of bigrammes and $W_2$ /y being a subset of the bigrammes in $W_2$, starting with y;

calculate the relative frequencies f(z|y) on $W_1$, initializing all the parameters λ(y)=0.5, and for each parameter λ(y), iterating the iterative formula as long as the likelihood of $W_2$/y calculated by the formula:

increases.

10. A system according to claim 9, wherein the network of finite states is constructed with the imposition of two sets of constraints:

an acoustic set limiting sequences of phonemes permitted to correspond with the phonetic transcriptions of the words, and a linguistic set, associating the estimated probabilities with the pairs of words.

11. A system according to claim 10, wherein said first set of constraints is imposed in a manner such as to make use of the acoustic similarity of the words and the set of words is organized in a tree.

12. A system according to claim 10, wherein second set of constraints is imposed in a manner such that, for each word in the lexicon, the set of successors actually observed in the learning text is organized in a tree.

13. A system according to and claim 12, wherein said system carries out a factorization of the probabilities of the network of finite states by the application of a method of factorizing probabilities on a tree of the entire lexicon (AL) and on trees of successors (as(w)).

14. A system according to claim 13, wherein, in order to construct the network representing the model of the language, said carries out the steps of:

constructing the tree of the entire lexicon (AL), constructing, for each word of the lexicon, the tree of successors appearing in the learning text, inserting the probabilities provided by the language model by means of empty transitions, transfering the probabilities into the trees, factorizing the probabilities in the trees, eliminating the superfluous empty transitions, labelling the remaining empty transitions with a fictitious symbol, labelling each limb with a string obtained by linking the phoneme or the fictitious symbol, the probability and the word, if present, optimizing the network, and reassigning to each limb the phoneme or symbol, the probability, and possibly the word, starting from the string obtained in the step of labelling the limbs.

15. A system according to claim 14, wherein the step of factorizing the probabilities in the trees comprises a method constituted by the following steps:

in which:

T is the tree to be factorized;

a,b,n,s are states of T;

r is the root of T;

F(n) is the set of successor states of the state n;

p(a,b) is the probability of the limb from a to b.

16. A system for recognizing continuous speech configured so as to perform the following steps, acquisition of an acoustic signal comprising words spoken by a speaker in form of numeric samples, transformation of the sampled speech into a sequence of acoustic feature vectors, conveying spectral information;

decoding of the feature sequence into a word sequence by employing a beam search based algorithm on a network of finite states that represents a linearly interpolated bigramme language model and embodies linguistic and lexical constraints;

wherein the language model is estimated by means of a stacked interpolation algorithm and wherein the language model network of finite states is built by optimizing a tree-based network.

17. A system according to claim 16, wherein both the estimation method and the network optimization algorithm can be extended to a generic n-grammes, with n>2.

* * * * *